J. F. MERKEL.
SELF PROPELLED VEHICLE.
APPLICATION FILED DEC. 23, 1915.
1,290,276.
Patented Jan. 7, 1919.
5 SHEETS—SHEET 1.
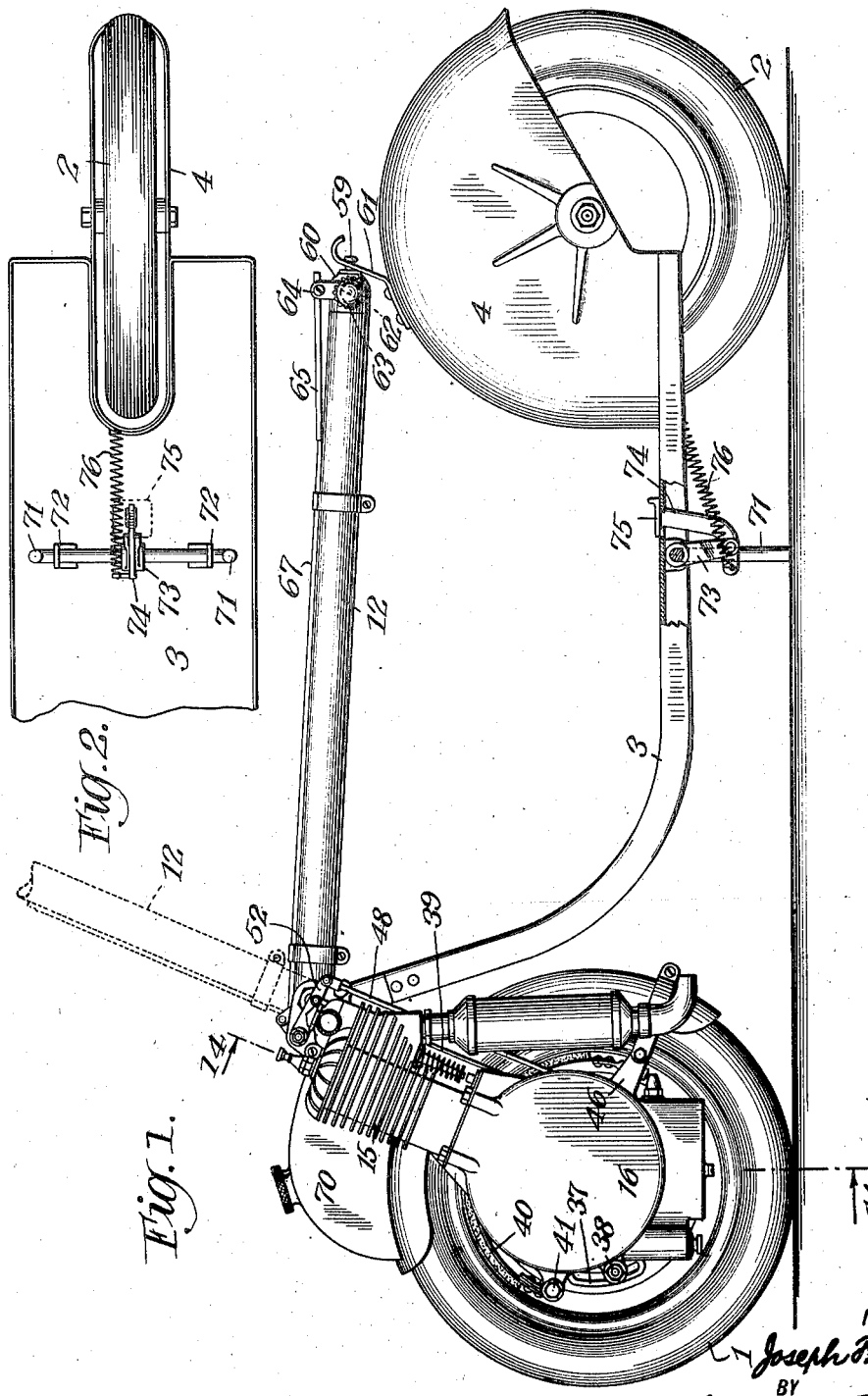
INVENTOR
Joseph F. Merkel
BY
Henry D. Williams
ATTORNEY

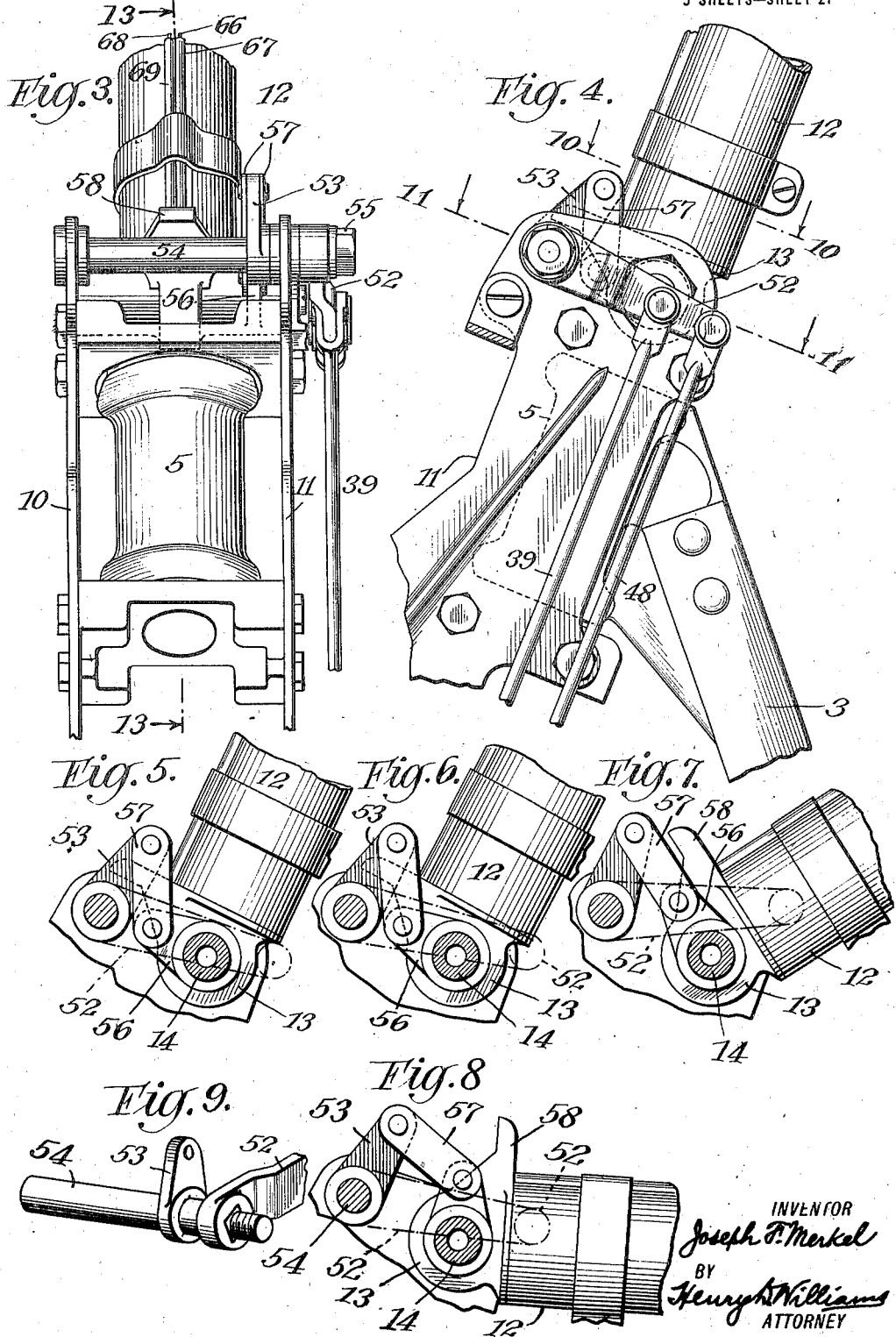

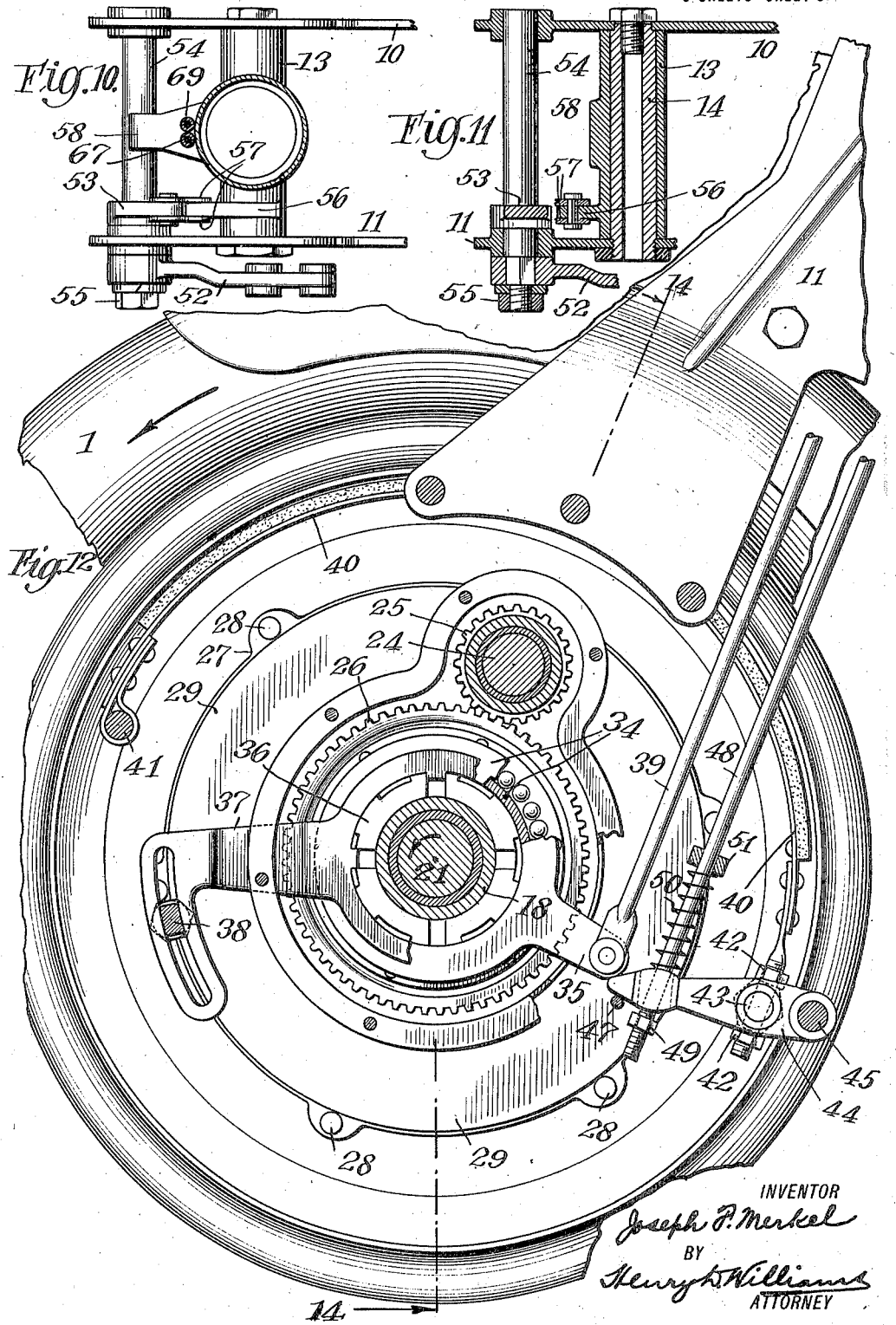

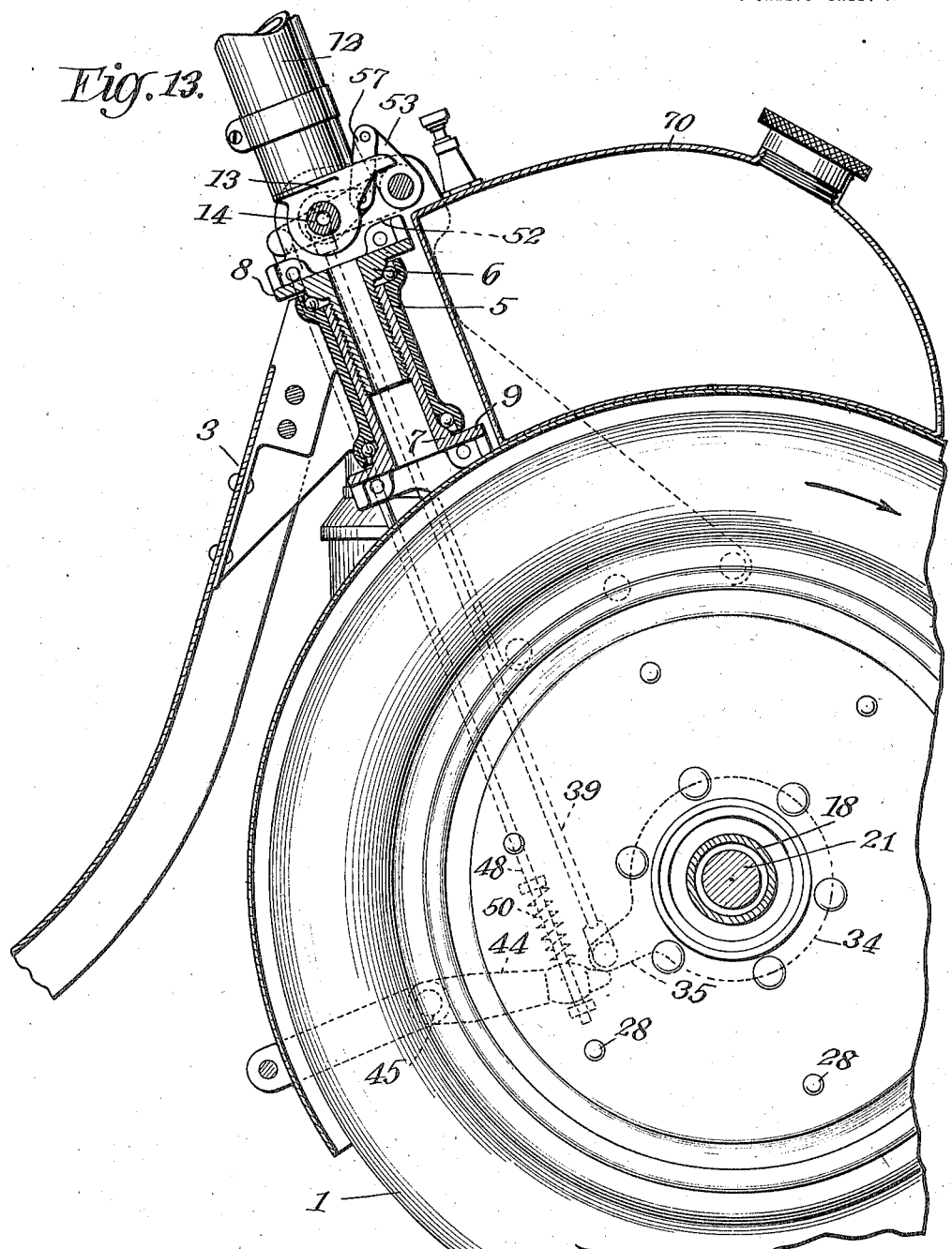

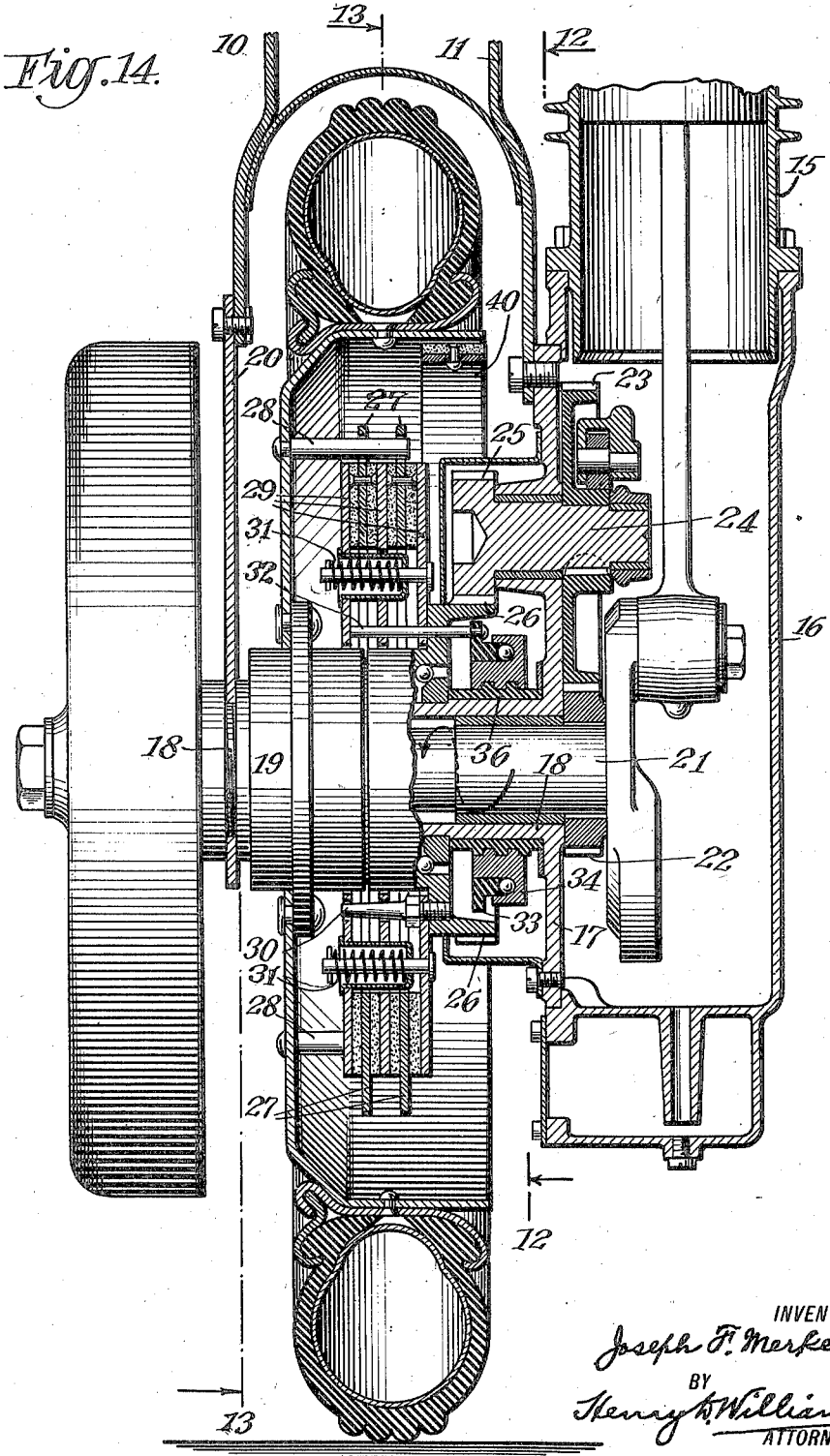

UNITED STATES PATENT OFFICE.

JOSEPH F. MERKEL, OF FLUSHING, NEW YORK.

SELF-PROPELLED VEHICLE.

1,290,276.　　　　　Specification of Letters Patent.　　Patented Jan. 7, 1919.

Application filed December 23, 1915.　Serial No. 68,343.

*To all whom it may concern:*

Be it known that I, JOSEPH F. MERKEL, a citizen of the United States, residing at Flushing, in the county of Queens and State of New York, have invented certain new and useful Improvements in Self-Propelled Vehicles, of which the following is a specification, reference being had therein to the accompanying drawings, forming part thereof.

My invention relates generally to self-propelled vehicles and relates more particularly to two-wheeled vehicles having the wheels arranged in tandem, although not necessarily restricted to vehicles of this type. General objects of my invention are to produce a practical passenger-carrying motor vehicle of small size, compact, of great portability and of very light weight and inexpensive construction, primarily intended to carry a single person preferably in the standing position upon the vehicle, such vehicle being intended largely to take the place of walking, and such vehicle being adapted to be pushed along or trundled by the dismounted rider and being adapted to be taken into the hallways of buildings and upon the passenger elevators thereof, if desired. Other objects and advantages of my invention will hereinafter appear.

My present invention relates more particularly to improvements in the controlling devices of such a self-propelled vehicle. Two other applications for patent filed on even date herewith are respectively directed to other features of improvements in the same self-propelled vehicle forming the subject of the present application, the subject matter of these other applications being in part disclosed in the drawings of the present application, the said other applications being respectively identified as Serial No. 68,344 which includes and relates more particularly to a transmission mechanism and Serial No. 68,345 which includes and relates more particularly to a lubricating device.

My present invention is directed to improvements in the controlling means for the vehicle and its engine and includes certain features of construction and combinations of parts as will appear from the following description.

I shall now describe the self-propelled vehicle embodying my invention which is illustrated in the accompanying drawings and shall thereafter point out my invention in claims.

Figure 1 is a side elevation as seen from the left side thereof of a self-propelled vehicle embodying my invention, a few of the parts being in section.

Fig. 2 is an inverted plan of the rear portion of such vehicle.

Fig. 3 is an enlarged front elevation of the steering head and its immediate adjuncts.

Fig. 4 is a side elevation of what appears in Fig. 3 as viewed from the right.

Figs. 5, 6, 7 and 8 are views similar to Fig. 4, but partly in vertical section and with parts omitted; illustrating successively different positions of the controlling bar and its connections.

Fig. 9 is a perspective of a bell crank forming a part of the controlling device.

Fig. 10 is a transverse section on a plane indicated by the slightly inclined line 10—10 of Fig. 4 as viewed from above.

Fig. 11 is a similar section on a plane indicated by the line 11—11 of Fig. 4.

Fig. 12 is a longitudinal vertical section on a plane indicated by the line 12—12 of Fig. 14 as viewed from the right.

Fig. 13 is a similar view indicated by the lines 13—13 of Figs. 3 and 14 as viewed from the left.

Fig. 14 is a partly vertical and a partly inclined transverse section through the axis of the front wheel substantially on planes indicated by the lines 14—14 of Figs. 1 and 12 as viewed from the left.

The self-propelled vehicle embodying my invention illustrated in the accompanying drawings comprises front and rear ground wheels or road wheels 1 and 2 and an intermediate drop frame 3 of pressed sheet metal, a pressed sheet metal combined rear wheel frame and mud guard 4 and a combined steering frame and engine frame for the front wheel 1, to be presently more particularly described. To give a better general idea of the self-propelled vehicle in which my invention has been embodied, it may be stated that in the particular vehicle illustrated in the drawings, the ground wheels 1 and 2 are fifteen inches in diameter to the outside of the tires and that the entire vehicle weighs about eightly to ninety pounds. The intermediate sheet metal frame or main frame 3 in its rear and middle portions provides a level or horizontal platform below the level of the axes of the ground wheels 1 and 2, and the operator or driver of the vehicle stands upon this platform and preferably is intended to be the only person carried by the vehicle. The forward upturned end of the intermediate drop frame 3 is provided with a frame head or steering head 5 and the steering frame is pivotally mounted upon the steering head 5 by means of ball bearings including upper and lower tubular cone members 6 and 7, as more clearly appears in Fig. 13. The tubular bearing cones 6 and 7 are shown as provided respectively with upper and lower enlarged portions 8 and 9 forming somewhat irregular rectangular flanges to which are rigidly bolted right and left plate-like fork sides 10 and 11 of the steering frame, these fork sides extending downward below the base portion 9 of the lower cone 7 and also being shown as projecting somewhat above the upper enlarged portion or head 8 of the upper cone 6. A tubular handle bar 12 which forms both a steering bar and a controlling bar, as will hereinafter appear, has a foot 13 which is pivoted between the spaced upwardly projecting ends of the fork sides 10 and 11 by means of a transverse horizontal tubular pivot stud 14. The handle bar pivot stud or short tubular shaft 14 firmly and rigidly connects together the upper ends of the fork sides 10 and 11, being shown as provided at the right with a tap bolt and at the left with a clamp nut, as clearly appears in Fig. 11. It will be observed that the handle bar 12 is capable of two movements, a rotational or angular movement in which it carries the steering frame with it and which is the steering movement, and an upwardly forward and downwardly backward rocking movement which is the controlling movement for controlling the operation of the vehicle by means of the instrumentalities of my present invention as will hereinafter appear.

The front wheel or steering wheel 1 of the self-propelled vehicle is engine driven and for this purpose an internal combustion engine is provided having a cylinder 15, a crank case 16 and a crank case cover 17 which forms a part of the engine frame and which is firmly bolted to the end of the left fork side 11 so as to form an extension thereof and to form a part of the steering frame also, as clearly appears in the drawings, particularly in Fig. 14. Also it is to be noted that the crank case cover 17 is provided with a projecting sleeve 18 upon which the engine driven steering wheel 1 is rotatively mounted by means of its hub 19, and that an end piece or extension 20 of the right fork side 10 is connected to the farther end of the wheel-carrying crank case sleeve 18. It will now be clear that the frame which carries the engine driven steering wheel 1 is pivoted on the main frame 3 for steering movement and that the engine for driving the steering wheel is carried by the steering frame.

Means including a clutch are provided for connecting the engine to the steering wheel 1. The engine has a crank shaft 21 shown as journaled in the engine frame sleeve 18, and the above mentioned connecting means include a primary pinion gear 22 carried within the crank case by the crank shaft 21, a secondary gear 23 which is engaged by the primary gear 22 and which is mounted within the crank case upon a short shaft 24 journaled in a bearing formed in the crank case cover 17 of the engine frame and provided outside of the crank case adjacent to the ground wheel 1 with an intermediate pinion 25 which engages a power-applying gear 26, which latter is journaled upon the engine frame sleeve 18 alongside of the front wheel hub 19 but nearer to the crank case cover 17. The power-applying gear 26 may be connected to the steering wheel 1 to drive the same by means of a multiple disk clutch shown as located within the peripheral portion of the steering wheel 1 and having one set of disks or shoe plates 27 coupled to the drum or web of the front wheel 1 by means of anchor studs or drive studs 28, and having another set of disks or driving plates 29 connected to the power-applying gear 26 by means of clutch driving studs 30. The two sets of clutch plates 27 and 29 are firmly held in engaging position or driving relation by means of clutch springs 31 which act by their expansion to draw together the outer driving plates 29 by means of headed pins and spring-containing cups, as clearly appears in Fig. 14; and the two sets of clutch plates are adapted to be disengaged by means of clutch-disengaging push pins 32 which abut the farthermost driving plate 29 and which pass slidably through the web portion of the power-applying gear 26 and carry at their outer ends a push plate 33. The anchor studs 28, the driving studs 30 and the push pins 32 may be of any suitable number, for example, six of each, that being the number in the vehicle illustrated in the drawings. The push plate or thrust ring 33 is adapted to be moved inward to disengage the clutch by means of a clutch-disengaging screw member or worm nut 34 shown as provided with a lever arm or operating arm 35 which projects rearward and slightly downward as appears in Figs. 12 and 13 of the drawings. Friction-reducing balls forming a thrust bearing are shown as interposed between the thrust plate 33 and the worm nut or movable screw member 34.

The thrust-applying clutch-disengaging worm nut 34 is rotative upon a stationary clutch worm or thrust worm 36 which is mounted upon the engine frame sleeve 18 between the power-applying gear 26 and the crank case cover 17 of the engine frame. The stationary screw member or thrust worm 36 is rotatively adjustable upon the sleeve 18 by means of a forwardly projecting clutch-adjusting lever 37 which is notched over the outer end of the clutch worm 36 as appears in Figs. 12 and 14 and which is adjustably anchored to the crank case 16 of the engine frame by means of an anchor stud 38 which passes through an arcuate slot in the end of the lever 37, as appears in Figs. 1 and 12. It should be noted that the worm threads of the interengaging screw members 34 and 36 are left-hand threads, from which it will appear that counter-clockwise rotation imparted to the worm nut 34 as viewed from the right in Fig. 14 and as appears from the front in Fig. 12, such counter-clockwise rotation corresponding to an upward movement of the lever arm 35, will result in clutch-disengaging thrust being applied by the worm nut 34 to the push plate 33. On the other hand, rotation of the worm nut 34 in the opposite or in a clockwise direction, corresponding to a downward movement of the lever arm 35, will remove the thrust from the push plate 33, thereby permitting the clutch springs 31 to bring the two sets of clutch plates 27 and 29 into engaging or driving relation. An upwardly and rearwardly extending clutch-controlling actuating rod 39 is pivoted, as shown, to the free end of the lever arm 35 of the rotative clutch-operating worm nut 34.

The particular transmission mechanism which has just been briefly described is included in the subject matter of my application for patent hereinbefore mentioned but necessarily had to be to some extent disclosed and described herein by reason of the fact that such transmission mechanism constitutes the means for connecting the engine to the ground wheel 1 and coöperates with and is acted upon by the controlling device or mechanism of my present invention as will hereinafter appear.

A substantially semi-circular expanding strap brake 40 is provided for the engine driven steering wheel 1, the brake strap 40 being pivotally anchored at its forward end to the crank case 16 of the engine frame by means of an anchor stud 41 as appears in Figs. 1 and 12. The brake strap 40 bows upwardly and extends rearwardly in semi-circular form to a point substantially diametrically opposite to the anchor stud 41 and at its rear end has an adjustable connection by means of nuts 42 to a pivot stud 43 carried by a brake lever 44 which is pivoted upon a stud 45 projecting from an extension 46 from the engine crank case 16 as more particularly appears in Figs. 1 and 12. The brake lever 44 projects forward toward and slightly into overlapping relation with the clutch-operating lever arm 35, but these two levers do not touch nor come into any engagement with each other. A stop pin 47 projects from the crank case cover 17 of the engine frame in the path of the end of the brake lever 44 for stopping the downward movement of the brake lever 44 at the disengaged position of the brake band or brake strap 40. An upwardly and rearwardly extending brake-operating-rod 48, which is parallel with the clutch operating rod 39, passes loosely through the brake lever 44 as appears in Fig. 12 and at its lower end is provided with a brake-adjusting nut 49. A brake-disengaging coiled thrust spring 50 surrounds the brake-operating rod 48 above the brake lever 44 and thrusts between such lever and an abutment lug 51 on the crank case cover 17 through which the brake-operating rod 48 is slidable. It has been hereinbefore noted that upward movement of the clutch-operating rod 39 will disengage the clutch, and it is now to be noted that a corresponding upward movement for the brake-operating rod 48 will apply the brake by bringing the brake strap 40 into braking relation with the inside of the rim of the engine driven steering wheel 1, as clearly appears in the drawings particularly in Figs. 12 and 14.

The clutch and the brake mechanisms or devices hereinbefore described are both controlled in their operation by means of the backward and forward rocking controlling movement of the combined controlling and steering handle bar 12 hereinbefore mentioned. At their upper ends the clutch-controlling or clutch-operating rod 39 and the brake-controlling or brake-operating rod 48 are both pivoted to a common lever arm or control lever 52 for similar concurrent upward or downward clutch-controlling and brake-controlling movement. The lever arm 52 is the longer rearwardly extending arm of a bell crank lever having a shorter upwardly and slightly rearwardly projecting arm 53 shown as projecting from a short transverse control shaft or pivot stud 54 with which in the particular construction illustrated the lever arm 53 is formed integral. At the left the pivot stud 54 has a squared end, as appears in Fig. 9, upon which the longer lever arm 52 is mounted and firmly held by a nut 55, so that the two lever arms 52 and 53 forming the bell crank are rigidly rotatively connected to move together. The short control shaft or pivot stud 54 extends between and is pivotally carried by the upwardly projecting ends of the fork sides 10 and 11 in a position forward of the pivot rod 14 of the handle bar 12 as clearly appears in the drawings.

It will be noted in this connection that the squared end of the pivot stud 54 of the bell crank projects beyond the upper end of the left fork side 11 as most clearly appears in Figs. 3, 10 and 11 of the drawings, so that the longer arm 52 of the bell crank is located at the outside of the left fork side 11 while the shorter arm 53 is between the fork sides adjacent to the left fork side 11.

The foot 13 of the handle bar 12 at the left side thereof is provided with a front lever arm 56 which in the uppermost or fully forward position of the handle bar 12, appearing in Figs. 3, 4, 10 and 13 of the drawings, projects forward and slightly upward substantially in line with the axis of the pivot pin 54 of the bell crank. The end of the lever arm 56 is pivotally connected to the end of the shorter arm 53 of the bell crank by means of a pair of intermediate links 57 so that the lever arm 56, carried by the handle bar 12, and the links 57 together form a toggle connecting the handle bar 12 to the shorter arm 53 of the bell crank. The foot 13 of the handle bar 12 is also provided with a forwardly projecting stop lug 58 which in the forward position of the handle bar 12, shown in Figs. 3, 4, 10 and 13 and indicated in dotted lines in Fig. 1, abuts against the pivot bolt 54 of the bell crank and prevents any further forward movement of the handle bar 12. However, the handle bar 12 is free to be moved in a rearward and downward direction from the forward and slightly inclined position just mentioned, to the substantially horizontal folded position appearing in Figs. 1 and 8.

The toggle and the bell crank just explained form operating devices connecting the controlling bar or handle bar 12 to the clutch lever 35 and to the brake lever 44 and are adapted upon rocking movement of the controlling bar 12 on its pivot 14 in the rearward direction, first to disengage the clutch, and then with further rearward movement of the controlling bar 12 to apply the brake, and with yet further movement rearward of the controlling bar 12 to release the brake while leaving the clutch still disengaged. Successively different clutch-controlling and brake-controlling positions of the handle bar 12 are illustrated in Figs. 4, 5, 6, 7 and 8. As illustrated in Fig. 4, the handle bar 12 is at its fully forward or most nearly upright position with the lug 58 stopped against the bolt 54, and as illustrated in Fig. 5 the position of the handle bar 12 and other parts is only slightly different from that illustrated in Fig. 4, in Fig. 5 the handle bar 12 being rocked slightly backward from the position shown in Fig. 4 and the longer arm 52 of the bell crank is shown as correspondingly raised to a higher position through the action of the toggle formed by the lever arm 56 and links 57 upon the shorter arm 53 of the bell crank. However, in both of these positions of the handle bar 12 illustrated in Figs. 4 and 5, the longer arm 52 of the bell crank is in sufficiently lowered or depressed position to maintain, through the respective connecting rods 39 and 48, the clutch in the engaged condition and the brake in the released condition, these and other positions intermediate thereto being what are known as running positions of the clutch-controlling and brake-controlling handle bar 12.

When the handle bar 12 is moved somewhat farther to the rear to or in the neighborhood of the position illustrated in Fig. 6, the longer arm 52 of the bell crank will be raised higher by reason of the straightening out of the toggle and its consequent thrust upon the shorter lever arm 53 of the bell crank, and the longer lever arm 52 will raise the clutch-controlling or clutch-operating rod 39 sufficiently to disengage the clutch by reason of the counter-clockwise rotation and consequent inward travel or thrust of the worm nut 34, as hereinbefore explained, but in the position of the handle bar 12 illustrated in Fig. 6, the brake will not be applied but will yet remain in the released condition by reason of the predetermined relative adjustment of the brake and clutch, as also hereinbefore explained.

When the handle bar 12 is moved farther rearward, for example to or in the neighborhood of the position illustrated in Fig. 7, the brake will be applied by reason of the further elevation of the brake-controlling or brake-operating rod 48, the clutch, however, remaining disengaged, the additional thrust imparted to the clutch-releasing push pins 32 by reason of the additional rotation imparted to the worm nut 34 serving only to further or more widely separate the two sets of coacting clutch plates 27 and 29. It will be noted, in the position of the parts illustrated in Fig. 7 that the toggle formed by the short lever arm 56 and the links 57 is completely straightened out along its center line so that it imparts maximum thrust and maximum braking effect. It will be further noted that movement of the handle bar 12 in either direction from that appearing in Fig. 7 will have a like effect in lowering the clutch-operating rod 39 and the brake-operating rod 48.

In view of the foregoing description, it will be understood that movement of the handle bar 12 in either direction from that appearing in Fig. 7 will result first in releasing the brake, while the clutch will remain disengaged. For example, if the handle bar 12 be moved farther rearward to its lowermost or folded position shown in Figs. 1 and 8, the position of the bell crank arms 52 and 53 and consequently of the clutch-operating rod 39 and brake-operating rod 48 will be lowered substantially to the position that is illustrated in the other and forward position of the handle bar 12 appearing in Fig. 6, in which, as hereinbefore described, the brake is released and the clutch disengaged, this also therefore being the condition of the brake and clutch in the position of the handle bar and other coöperative parts illustrated in Figs. 1 and 8, in which the clutch is disengaged and the brake released, as will be readily seen by noting the position of the lever arms 52 and 53 in Figs. 6 and 8.

It will now be readily understood and it is to be noted that with the handle bar 12 in the position shown in Fig. 4 or in the neighborhood of that position, for example as shown in Fig. 5, the clutch is engaged and the brake released, this being the usual running position of the vehicle controlling parts; that with the handle bar 12 in the position shown in Fig. 6 or in the neighborhood of that position, the clutch is disengaged and the brake not yet applied but is still in the released condition; that with the handle bar 12 in the position shown in Fig. 7 or in the neighborhood of that position, the clutch remains disengaged and the brake has been applied; and finally that in the position of the handle bar 12 shown in Figs. 1 and 8 the same condition of the clutch and brake prevails as in the position of the handle bar 12 and other parts shown in Fig. 6, in which, as hereinbefore described, the clutch is in the disengaged and the brake in the released condition.

It is also to be noted and is of importance that a reverse movement of the handle bar 12 from the folded position shown in Figs. 1 and 8 upward and forward to the slightly inclined position shown in Fig. 4 and as indicated in Fig. 1, will reverse this series of operations as to the clutch and brake, that is to say, starting from this rearward or folded position of the handle bar 12 with the clutch disengaged and the brake released, as the handle bar 12 is moved upward and forward, the brake is first applied then the brake is released and then the clutch is engaged. The reason for or the desirability of the several successive operations hereinbefore mentioned will now be more particularly described.

For ordinary running the handle bar 12 is preferably kept at a position slightly in the rear of its fully forward position shown in Fig. 4 and indicated in Fig. 1 and is preferably kept at about the position shown in Fig. 5, thereby avoiding the communication of unpleasant vibration to the handle bar 12 such as would result were it kept firmly pressed forward with its stop lug 58 in contact with the abutment formed by the pin 54, as hereinbefore described. As the handle bar 12 is moved rearward from the position shown in Fig. 5 toward the position shown in Fig. 6, the clutch will be very gradually disengaged and at certain intermediate positions the clutch will be only partly disengaged and will drive the steering wheel 1 with a slip which will be more or less and can be effectively controlled by means of the handle bar 12. This driving of the vehicle with a slipping clutch is desirable under some conditions of operation and under ordinary and most conditions of operation the engine will be controlled in the usual way by means of the usual or any suitable throttle control. Also for very low speeds, which may be temporarily highly desirable in conditions of congested traffic or other conditions, the clutch may be permitted to drive with slip as described. Also and of importance, in hill climbing the engine may be permitted to run at a normal speed, thereby avoiding stalling, and the vehicle may be driven up-hill with the clutch slipping, such manner of driving of course requiring less power than if an attempt were made to drive the vehicle up-hill at a high speed against the increased load of gravity. In this connection it should be noted that should the road be so bad or the hill so steep that the engine cannot propel the vehicle with a person thereon, the rider may step off and walk alongside the vehicle while the engine merely does the work of propelling the unloaded vehicle. The brake of course may be more or less strongly applied as desired after the disengagement of the clutch, by the movement of the handle bar 12 from the position shown in Fig. 6 toward that shown in Fig. 7. In the lowered position of the handle bar 12 appearing in Figs. 1 and 8 a button on a handle bar cap 59 which surmounts a handle bar headpiece 60 for the handle bar 12, is engaged by a catch 61 mounted upon the top of the combined rear wheel frame and mud guard 4, as appears in Fig. 1 of the drawings, the catch 61 securely holding the handle bar 12 at the folded position. In this folded position of the handle bar 12, it is of importance that the clutch shall be disengaged and also that the brake shall be released as has been hereinbefore described as being the condition of the clutch and brake for the folded position of the handle bar 12. A reason for this is so that the vehicle may be raised with the rear wheel 2 off the ground, either to an inclined or to a vertical position, preferably the latter, and thus trundled or pushed along upon the front wheel 1 in places where there is not much space, for example in a building or into an elevator.

In order to understand the complete operation of the vehicle, it is to be noted that the handle bar head 60 carries laterally projecting handle bar stems which form a T with the handle bar 12 and that grip handles are rotatively mounted upon the handle bar stems, one such, the left handle bar stem 62 and its rotative grip handle 63 appearing in Fig. 1, it being understood that a similar right handle bar stem and rotative grip handle are provided at the other side of the handle bar head 60. These rotative grip handles are utilized in a usual way for effecting the further control of the engine. For example, in the vehicle illustrated in the drawings, the left rotative grip handle 63 is shown as pivotally connected by means of a lever 64 with a controlling rod 65 a continuation of which is formed by a controlling wire 66 which is longitudinally movable through a protective sheath or cover 67, as more particularly appears in Figs. 1, 3 and 10. The controlling wire 66 is utilized to relieve the compression in the engine cylinder, which may be done in a usual or in any suitable way, for example, by holding open the usual exhaust valve of the engine, which is the way employed in the self-propelled vehicle illustrated in the drawings, or a similar result may be accomplished by means of a relief cock or valve provided for the purpose, as is well understood. The other rotative grip handle, that is to say the one at the right, is similarly connected to and similarly operates a throttle-controlling wire 68 having a cover sheath 69, as appears in Figs. 3 and 10, and the throttle-controlling wire 68 controls the engine by means of its throttle in a usual way, well understood in the general art of self-propelled vehicles. In fact the compression release and the throttle control just mentioned may be substantially the same as has heretofore been commonly employed upon that type of self-propelled vehicles known as motor cycles. As is well understood, the control of the throttle controls within certain limits, the speed of the engine. The release of compression in the engine cylinder is employed for starting and also is employed for stopping the engine. It is to be noted, as more particularly appears in Figs. 1 and 13 that a fuel tank 70 is mounted upon the steering frame above the steering wheel 1.

In the operation of the vehicle, the passenger stands upon the platform provided by the middle and rear widened portions of the sheet metal drop frame 3, grasping the left grip handle 63 with his left hand and grasping the other similar grip handle with his right hand. The steering of the vehicle is effected by a twisting movement imparted to the handle bar 12, the control of the clutch and brake is effected by imparting a rocking movement to the pivoted handle bar 12, and the control of the throttled and of the compression relief is effected by rotative movements imparted to the grip handles. It will now be clear how complete control of the engine and vehicle are effected.

For adding to the practicability of the vehicle, a stand or vehicle support is provided and comprises stand legs 71 pivoted on brackets 72 on the lower side of the platform of the intermediate frame 3 and movable downward to the vehicle-supporting position illustrated in Figs. 1 and 2 by means of a two-part or divided stand lever 73 and stand pedal 74 pivoted to the lever 73 and provided at its upper end above the platform, through which it passes, with a foot plate 75. The stand legs 71 are foldable rearward and upward against the platform and are moved to the folded position by means of a retractile spring 76 and are held in the downward vehicle-supporting position by means of a notch which provides a shoulder on the stand pedal 74 for engaging the lower side of the platform, as appears in Fig. 1.

It is obvious that various modifications may be made in the construction shown in the drawings and above particularly described within the principle and scope of my invention.

I claim:

1. A self-propelled vehicle having, in combination, an engine-driven ground wheel, an engine for driving the ground wheel, means including a clutch for connecting the engine to the ground wheel, a brake for the ground wheel, a pivoted combined clutch-controlling and brake-controlling bar, a toggle one link of which forms a lever arm movable with the said controlling bar, a bell-crank to one arm of which the other toggle link is pivoted, and operating connections connecting the other arm of the bell-crank to the clutch and to the brake.

2. A self-propelled vehicle having, in combination, an engine-driven ground wheel, an engine for driving the ground wheel, means including a clutch for connecting the engine to the ground wheel, a brake for the ground wheel, a pivoted combined clutch-controlling and brake-controlling bar, a toggle one link of which forms a lever arm movable with the said controlling bar, a bell-crank to one arm of which the other toggle link is pivoted, and operating connections connecting the other arm of the bell-crank to the clutch and to the brake, said toggle being arranged to pass its center line within the range of movement of said controlling bar and said operating connections being adapted upon movement of said controlling bar in one direction first to disengage the clutch and then with further movement of said controlling bar in the same direction to apply the brake and with still further movement of said controlling bar in the same direction past the center line of the toggle to release the brake, and upon return movement of said controlling bar in the opposite direction to reverse this series of operations.

3. A controlling device for a self-propelled vehicle, such device having, in combination, a pivoted controlling bar, a toggle one link of which forms a lever arm pivotally movable with the pivoted controlling bar, a bell-crank to one arm of which the other toggle link is pivoted, and vehicle-controlling connections connected to the other arm of the bell-crank.

4. A self-propelled vehicle having, in combination, an engine-driven ground wheel, an engine for driving the ground wheel, means including a clutch for connecting the engine to the ground wheel, a brake for the ground wheel, a pivoted controlling bar, and operating devices connecting the control bar to the clutch and to the brake and adapted upon movement of the controlling bar in one direction on its pivot first to disengage the clutch and then with further movement of the controlling bar in the same direction to apply the brake and with yet further movement of the controlling bar in the same direction to release the brake, leaving the clutch disengaged.

5. A self-propelled vehicle having, in combination, a plurality of ground wheels, means for steering one of the ground wheels including a controlling bar pivoted for controlling movement on its pivot, an engine for driving one of the ground wheels, means including a clutch for connecting the engine to the ground wheel, a brake for the ground wheel, and connecting devices adapted to successively disengage the clutch and apply the brake and release the brake as the combined steering and controlling bar is moved on its pivot away from a running position in which the clutch is engaged and the brake released, and to successively reverse these operations upon the return movement of the said controlling bar.

6. A controlling device for a self-propelled vehicle, such device having, in combination, a pivoted controlling bar, a lever arm pivotally movable with the pivoted controlling bar, a two-armed pivoted lever, a link connecting said lever arm to one of the arms of the two-armed lever, and vehicle-controlling connections connected to the other arm of the two-armed lever.

7. A self-propelled vehicle having, in combination, a plurality of ground wheels, a vehicle main frame, a steering frame carrying one of the ground wheels and pivoted on the main frame for steering movement, an engine for driving the steering wheel carried by the steering frame, means including a clutch for connecting the engine to the steering wheel, a brake for the steering wheel, a combined steering and controlling bar pivoted on the steering frame for controlling movement on its pivot, a lever arm pivotally movable with the pivoted controlling bar, a lever pivoted on the steering frame, a link connecting said lever arm to said lever, and operating connections connecting said lever to the clutch and to the brake.

In testimony whereof I have affixed my signature.

JOSEPH F. MERKEL.